(No Model.)  2 Sheets—Sheet 1.

W. BEEBE.
GRAIN DRIER AND COOLER.

No. 284,266.   Patented Sept. 4, 1883.

Witnesses:
T. H. Parsons.
J. R. Drake.

Winsor Beebe,
Inventor, by
J. R. Drake
Atty.

(No Model.) 2 Sheets—Sheet 2.

W. BEEBE.
GRAIN DRIER AND COOLER.

No. 284,266. Patented Sept. 4, 1883.

Witnesses:
T. H. Parsons.
J. R. Drake.

Winsor Beebe,
Inventor, by
J. R. Drake,
Atty.

UNITED STATES PATENT OFFICE.

WINSOR BEEBE, OF BUFFALO, NEW YORK.

GRAIN DRIER AND COOLER.

SPECIFICATION forming part of Letters Patent No. 284,266, dated September 4, 1883.

Application filed January 15, 1883. (No model.)

*To all whom it may concern:*

Be it known that I, WINSOR BEEBE, a citizen of the United States, residing at Buffalo, in the county of Erie and State of New York, have invented certain new and useful Improvements in Grain Driers and Coolers, of which the following the following is a specification, reference being had therein to the accompanying drawings, in which—

Figure 1:
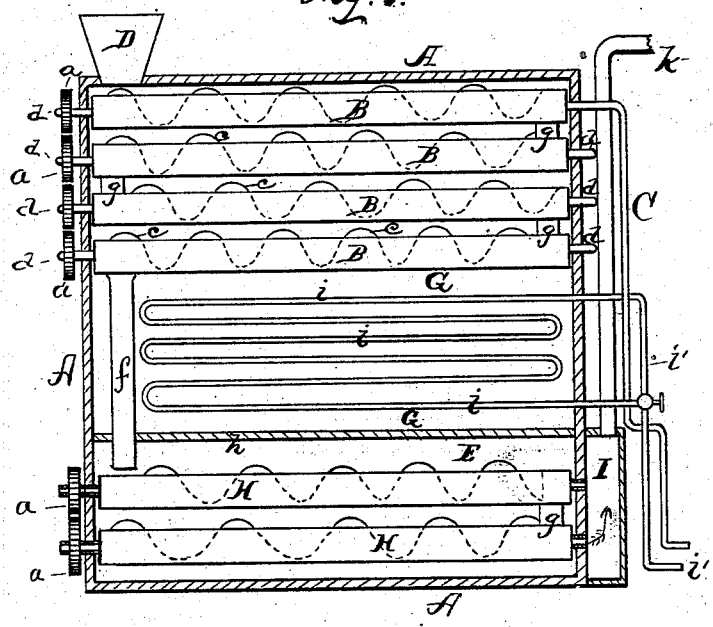
Figure 2:
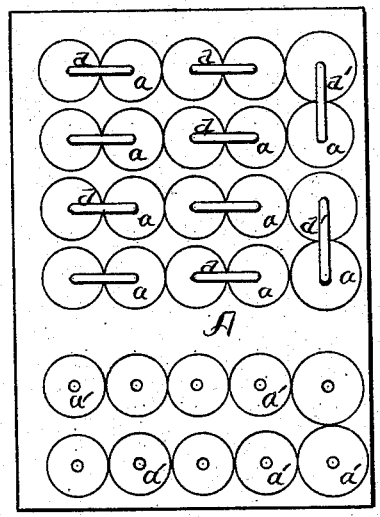
Figure 3:
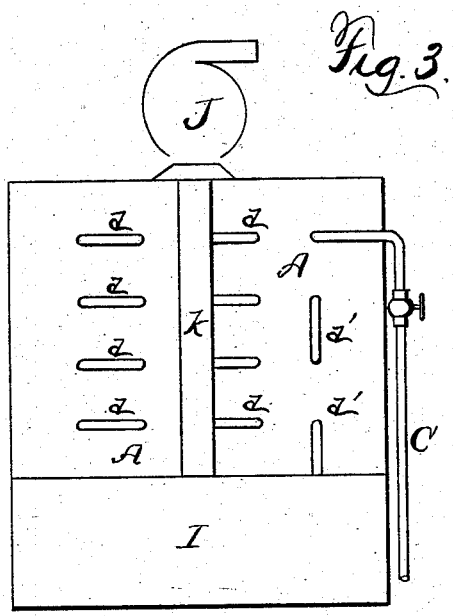
Figure 4:
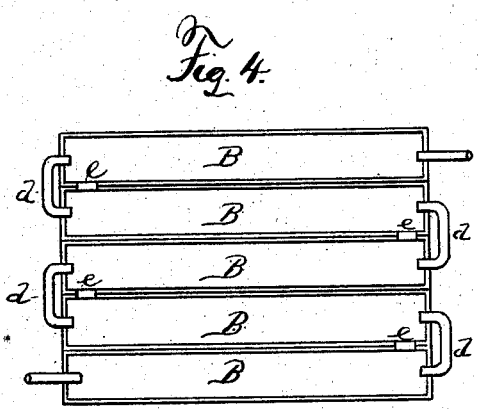

Figure 1 is a side elevation of my drier, partly in cross-section; Fig. 2, one end of the drier, showing the gear-wheels, &c., and Fig. 3 an elevation of the opposite end. Fig. 4 is a top plan view of the conveyer-troughs, (conveyers removed,) showing the communication of one with the next.

A A represent the sides, top, and bottom of a room or box which incloses the operating and other parts of the drier.

The invention consists in combining in one chest, room, or box a series of right and left hand conveyers, through the hollow shafts of which steam is introduced, and by connections one with another, so that a circulation of steam is kept up while the conveyers are moving the grain; also, in combining with the above a heating-space below the troughs, in which steam in pipes is used, and below this a partitioned-off space in which cold air is sucked through, also through the hollow conveyers therein, and in which the grain is cooled as it comes from the heating-conveyers above, all as fully hereinafter explained.

B B are a series of troughs arranged in line close together, also in rows above and below. (See Fig. 1.) In each of these troughs is a hollow-shaft metal conveyer, *c*, such as are used in milling, &c., and therefore, not being new, are not specially shown or described.

On the outside of the box A are gear-wheels *a a*, meshing together, so as to get a right-hand movement from one and a left-hand movement of the next. This movement I do not claim, as it is used in milling; but I believe myself the first to apply these conveyers, troughs, and gears to a grain-drier. On the other end of the drier a steam-pipe, C, leading from a boiler, discharges steam into the first hollow shaft of the first conveyer *c*, and which passes entirely through it to a connecting-pipe, *d*, at the extreme end, which connects it to the next conveyer, and by a similar pipe, *d*, at the opposite end, connects with the next, and so on, carrying steam from one conveyer to the next, and by a similar pipe-connection, *d'*, down to the conveyer in the row below, (see Fig. 3,) the steam finally escaping at the last in the row. All the conveyers, at their connection with the steam-pipes, have a revolving steam-tight joint of my own invention; but being applicable to other purposes and devices, I do not describe them here other than as "revolving steam-joints."

The operation of the foregoing described parts is: The grain is put into the hopper D and empties into the first trough B of the top row. The conveyer therein carries it to its opposite end, where there is a side opening, *e*, leading into the next trough B, the action of the conveyer bringing the grain to this end and forcing it gradually against the end of the trough and through this opening *e* into the next trough, which has a corresponding opening. The conveyer in this trough, having a reverse movement, caused by the gear-wheel outside meshing into the first one, carries the grain to its opposite end, where there is a similar opening, *e*, into the next trough, and so on. Thus the grain, being gradually heated by the steam in the hollow-shaft conveyers, gets carried from one trough to another until it comes to the last in the row, when a spout, *g*, drops it into the first trough B below, (see Fig. 1,) and, after going through that series, it drops into the row below by a similar spout, *g*, till it reaches the last, when it finally falls, by a spout, *f*, into the cooling-room E below, which is at the bottom of the room or box. Between this cooling-room E and the lower tier of troughs above is a heating-space, G, heated by steam-pipes *i i*, and divided from the cooling-room below by a floor or division-plate, *h*. The constant radiation of heat from these pipes *i* fills the space G and all above where the troughs B are, and greatly aids in drying the grain. When the hot grain drops into the cooling-room E by the spout *f*, it falls into the first trough H of a series of troughs and conveyers, each having also a hollow-shaft conveyer therein, which carries the grain to the next trough through a similar opening, *e*, as before described, and after passing through the first series of troughs H it drops into the next below by a pipe, *g*, the same as before described. These conveyers are operated by outside gear-wheels, a' a', the same as those above. The hollow shafts extend beyond the gears a little, and are open, so as to draw in cold air, as shown in Fig. 1. At the other end of the cooling-room E is an extended boxed-up space or bonnet, I, having a large air-pipe, k, running therefrom and connecting with an exhaust-fan, J. (See Fig. 3.) By this, cold air is taken at the opposite end of space E, and through the hollow shafts of the conveyers, and into the bonnet I, and makes its exit at the fan. This thoroughly cools the grain and completes the process of heating and drying. After this it drops from the last trough in the cooling-room into a receiver.

By this simple and comparatively inexpensive device, less room or space is occupied than is usual and a surer result is obtained, and at a far less cost than by the various expensive devices with which I am acquainted now in use. Its capacity is unlimited, it only being necessary to keep it fed slow or fast, according to the speed it is run. The heat is concentrated by passing through the hollow-shaft conveyers, and it heats the grain from the center rather than from the outside. Besides, if the grain and steam are first taken in at the same end, the grain follows the steam clear to its exit, and all the time the heat from the steam-pipes in the chamber below is aiding to dry the grain from the outside.

I claim—

In a grain-drier, the combination, in one device or box, of the series of troughs and hollow conveyers connected by steam-pipes $d$ and $d'$, the heating-space G, with steam-pipes $i$ therein, and the cooling-room E below, separated by floor or plate $h$, with a series of troughs, H H, and hollow-shaft conveyers therein, and the bonnet I, pipe $k$, and suction-fan J, all arranged and operating substantially as specified.

In testimony whereof I affix my signature in presence of two witnesses.

WINSOR BEEBE.

Witnesses:
J. R. DRAKE,
GEO. A. BENNETT.